United States Patent [19]

Halladay

[11] Patent Number: 5,314,955
[45] Date of Patent: May 24, 1994

[54] OIL-RESISTANT COATING COMPOSITIONS

[75] Inventor: James R. Halladay, Fairview, Pa.

[73] Assignee: Lord Corporation, Erie, Pa.

[21] Appl. No.: 7,637

[22] Filed: Jan. 21, 1993

[51] Int. Cl.$^5$ .................. C08L 61/04; C08L 61/10; C08L 33/18; C08L 33/20

[52] U.S. Cl. .................. 525/139; 525/142; 524/81; 524/418

[58] Field of Search ............... 525/139, 140; 524/81, 524/418

[56] References Cited

U.S. PATENT DOCUMENTS

| | | | |
|---|---|---|---|
| 583,688 | 9/1949 | Shepard | 525/139 |
| 2,605,248 | 7/1952 | Fisk | 525/139 |
| 3,702,841 | 11/1972 | Sawko | 525/139 |
| 4,418,173 | 11/1983 | Brachmann et al. | 525/139 |
| 4,593,070 | 6/1986 | Oyama et al. | 525/139 |
| 4,774,288 | 9/1988 | Ridland | 525/139 |

*Primary Examiner*—James J. Seidleck
*Assistant Examiner*—W. Robinson H. Clark
*Attorney, Agent, or Firm*—W. Graham Buie

[57] ABSTRACT

A coating composition containing a hydrogenated acrylonitrile-butadiene copolymer, a phenolic resin, a curing component, and a solvent. The coating composition is useful for protecting elastomeric materials from corrosive materials such as oil or fuel. The coating composition is resistant to fatigue and provides for excellent adhesion to both rigid and flexible substrates.

20 Claims, No Drawings

OIL-RESISTANT COATING COMPOSITIONS

FIELD OF THE INVENTION

The present invention relates to oil-resistant coating compositions useful for coating elastomeric materials. More particularly, the present invention relates to coating compositions based on a hydrogenated acrylonitrile-butadiene copolymer rubber and a phenolic resin.

BACKGROUND OF THE INVENTION

Elastomeric materials are utilized in numerous industrial applications. For example, elastomeric materials are utilized in the manufacture of various hoses, seals, and insulating devices found in the engines of automobiles and other vehicles. In addition, devices for mounting the engines within these vehicles typically comprise one or more metal parts adhesively bonded to one or more elastomeric parts. In these and many other industrial applications utilizing elastomeric materials, the elastomeric materials are typically exposed to corrosive and degrading materials such as various solvents, oils and fuels. Elastomeric materials have a tendency to degrade when exposed to these types of materials, and there is a continuing search within the elastomer industry to create an elastomer which is resistant to corrosive materials.

One method of rendering elastomeric materials resistant to corrosive materials is to apply a protective coating to the elastomeric material. Various corrosion-resistant coatings previously utilized for both flexible substrates (e.g., elastomeric substrates) and rigid substrates (e.g., steel, stainless steel, aluminum or plastic) include polyurethanes, polysulfides and fluorocarbon elastomers. When applied to rigid substrates, traditional corrosion-resistant coatings such as fluorocarbon elastomers have been found to provide excellent resistance to oil and fuel. However, when applied to flexible elastomeric substrates such as natural rubber or polybutadiene, the fluorocarbon elastomers suffer from poor fatigue resistance, poor low temperature characteristics, and poor adhesion to the natural rubber or polybutadiene substrate.

A need currently exists for a protective coating for flexible elastomeric substrates such as natural rubber and polybutadiene that is resistant to fatigue and temperature variability, and that exhibits effective adhesion to the substrate.

SUMMARY OF THE INVENTION

The present invention is a coating composition which can be applied to flexible elastomeric substrates to provide excellent resistance to corrosive materials. The coating composition of the invention is resistant to fatigue and temperature variability and provides for excellent adhesion to flexible elastomeric substrates. More specifically, the coating composition of the invention comprises (a) a hydrogenated acrylonitrile-butadiene copolymer, (b) a phenolic resin, (c) a curing component, and (d) a solvent.

DETAILED DESCRIPTION OF THE INVENTION

The hydrogenated acrylonitrile-butadiene copolymer of the invention is prepared by hydrogenating an acrylonitrile-butadiene copolymer which has been prepared by reacting a conjugated diene and an unsaturated nitrile. The conjugated dienes useful for preparing the acrylonitrile-butadiene copolymers to be hydrogenated can be any of the well-known conjugated dienes including 1,3-butadiene; 2,3-dimethyl-butadiene; 1,3-pentadiene; 1,3-hexadiene; 2,4-hexadiene; 1,3-heptadiene; piperylene; and isoprene, with 1,3-butadiene presently being preferred.

The unsaturated nitriles useful for preparing the acrylonitrile-butadiene copolymers typically correspond to the following formula:

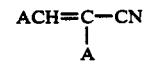

wherein each A is hydrogen or a hydrocarbyl group having from 1 to about 10 carbon atoms. Examples of A groups include alkyl and cycloalkyl, such as methyl, ethyl, isopropyl, t-butyl, octyl, decyl, cyclopentyl, cyclohexyl, etc., and aryls such as phenyl, tolyl, xylyl, ethylphenyl, t-butylphenyl, etc. Acrylonitrile and methacrylonitrile are the presently preferred unsaturated nitriles.

The copolymers are prepared by the reaction of the conjugated diene and unsaturated nitrile monomers in the presence of a free radical initiator by methods well known to those skilled in the art. Suitable free radical initiators or catalysts include organic oxides, peroxides, hydroperoxides, azo compounds, etc., such as hydrogen peroxide, benzoyl peroxide, cumene hydroperoxide, di-tert-butyl peroxide, ascaridole, acetyl peroxide, tert-butyl hydroperoxide, trimethylamine oxide, dimethylaniline oxide, isopropylperoxydicarbonate, diisobutylene ozonide, peracetic acid, nitrates, chlorates, perchlorates, azobisisobutyronitrile, etc. Suitable concentrations of the catalysts are between about 0.0001 and 5 percent and preferably between about 0.001 and 1 percent by weight of the total reaction mixture.

One of the methods which may be used for polymerizing the monomers is emulsion polymerization. By this method, polymerization takes place in an aqueous medium with the aid of emulsifying agents. The monomeric reactants are present almost entirely as emulsion or suspension droplets dispersed in the continuous phase. The emulsifying agent used is not critical and may be anionic, cationic or non-ionic. However, since the aqueous phase is present usually in greater quantity than the organic phase, the use of anionic agents resulting in an oil-in-water type emulsion may be preferred. Suitable emulsifying agents which may be used include such materials as the fatty acids and their soaps including substituted derivatives of the fatty acids and their soaps including substituted derivatives of rosin acids, sulfuric esters including salts of sulfated fatty oils and alcohols, alkane sulfonates, alkarylsulfonates, mahogany and petroleum sulfonates, as well as phosphorus-containing emulsifying agents. Some specific examples of emulsifying agents include the alkali metal salts of $C_{12}$ to $C_{18}$ straight-chain carboxylic acids, i.e., sodium stearate, sodium oleate, and mixtures thereof; acids obtained from tallow, coconut oil, palm oil, etc.; tall oil acid soaps; sodium lauryl sulfate; sodium dodecyl benzene sulfonate; sodium di(2-ethylhexyl)ortho-phosphate and the like. Any amount of emulsifying or suspending agent may be used which will provide at least a relatively stable emulsion or suspension of the polymerization ingredients. Generally, from about 0.5 to 10 percent by weight of emulsifying agent is sufficient.

The copolymers may also be prepared by polymerizing the monomers in bulk without the addition of other diluents. Alternatively, solution polymerization in the presence of inert hydrocarbon diluents such as butane, pentane, hexane, cyclohexane, offers the advantage of removing heat of polymerization as well as maintaining the solid polymer in a fluid slurry. Other suitable polymerization techniques may also be used.

The acrylonitrile-butadiene copolymers can be hydrogenated according to methods well known in the art such as reacting the copolymer with molecular hydrogen in the presence of an appropriate catalyst. The catalytic hydrogenation of the copolymer is typically carried out in the liquid phase, that is, the copolymer is either above its melting point or is dissolved in an organic solvent. The catalyst may be any of the metals or metallic compounds known to promote hydrogenation of nitriles, for example, platinum or ruthenium. A preferred catalyst is the specially prepared nickel known as Raney nickel, or the alloy skeleton cobalt described in U.S. Pat. No. 2,257,800. Another preferred class of catalysts comprises the metal chromites disclosed in U.S. Pat. No. 2,137,407, examples of which are copper chromite, as such or on a support such as kieselguhr, copper-barium chromite, cobalt chromite, nickel chromite and the like. The starting polymer contains unsaturation and it is often desirable to carry out the hydrogenation in two steps, whereby the carbon-to-carbon double bonds are first reduced, followed by reduction of the carbon-to-nitrogen bond. This procedure avoids the gelation of the hydrogenated polymers which may occur if the reduction is carried out in one step. In the first step, a different catalyst may be used, for example, a palladium or ruthenium catalyst. If desired, however, the nitrile groups alone may be reduced by proper choice of the catalyst, leaving unsaturated carbon-to-carbon bonds in the linear polymeric chain. It is possible also to use a combination of noble metal and nickel or cobalt, operating first at a relatively low temperature, then at a higher temperature.

Hydrogenation of the cyano groups will proceed at temperatures as low as 100° C. and even somewhat lower with the most active catalysts. In most cases, however, it is preferable to employ temperatures of at least 150° C. The temperature may be as high as can be safely used, for example, up to 350° C., the most useful range being between 200° and 275° C. A hydrogen pressure above about 500 lb./sq. in. is desirable. The pressure can be as high as the equipment will stand, a suitable range being between 1000 and 30,000 lb./sq. in.

The choice of a liquid medium for the hydrogenation, when such a medium is used, is not critical. It is only necessary that the medium have adequate solvent power for the copolymer to be hydrogenated and for the resulting hydrogenated copolymer to be soluble in the solvent. The solvent should be, of course, one which is stable at the hydrogenation temperature and substantially unreactive with ammonia and amines. Suitable solvents include, for example, tetrahydronaphthalene, decahydronaphthalene, benzene, toluene, the xylenes, cyclohexane, tetrahydrofuran, di-n-butyl ether, tetramethylene cyclic sulfone, dioxan and the like. The preferred solvents are the aromatic and alicyclic hydrocarbons and the alicyclic ethers. The quantity of solvent used is immaterial as long as there is enough of it to keep the polymeric materials in solution. The reaction medium should be substantially anhydrous, and it preferably does not contain more than about 5 percent of water by weight, in order to prevent the competitive hydrolytic reaction from affecting the cyano groups before they can be hydrogenated.

It is preferable, although not essential, to have ammonia or an aliphatic amine present in the hydrogenation mixture for the purpose of repressing formation of secondary amines by reaction between the amino and cyano groups. The quantity of ammonia may vary considerably, but it is preferable to use at least one mole of ammonia per acrylonitrile or alkacrylonitrile unit. Ammonia can be used in very large excess if desired.

Catalytic hydrogenation is the preferred procedure, but the copolymers may also be hydrogenated by non-catalytic methods, e.g., by treatment with an alkali metal such as sodium or potassium and a low molecular weight aliphatic alcohol such as methanol, ethanol, butanol and the like.

Other techniques for hydrogenating acrylonitrile-butadiene copolymers are disclosed in, for example, U.S. Pat. Nos. 4,581,417; 4,631,315; and 4,795,788; the disclosures of which are incorporated herein by reference.

The acrylonitrile-butadiene copolymers are typically hydrogenated to an extent such that the final product has an unsaturation level between about 1 and 20, preferably between about 3 and 7 mole percent.

The phenolic resins useful in the present invention can be any of the well known phenolic resins prepared, for example, by reacting a phenolic compound with an aldehyde compound under acidic, neutral or basic conditions with an appropriate catalyst. Phenolic resins useful in the invention include unmodified phenolic resins, cashew-modified phenolic resins, epoxy-modofied phenolic resins, and elastomer-modified phenolic resins.

The phenolic compound useful for preparing the present phenolic resins can be monohydroxy or multihydroxy phenolic compounds which may be substituted with groups such as alkyl, alkoxy, amino, halogen and the like. Examples of phenolic compounds useful in the invention include phenol, p-t-butylphenol, p-phenylphenol, m-bromophenol, o-chlorophenol, p-chlorophenol, p-alkoxyphenol, o-cresol, m-cresol, p-cresol, 2-ethylphenol, amylphenol, nonylphenol, xylenol, naphthol, carvacrol, cashew nutshell liquid, resorcinol, orcinol, phloroglucinol, pyrocatechol, pyrogallol, salicylic acid, bisphenol A, bisphenol S, combinations thereof, and the like, with phenol being presently preferred.

The aldehyde compound useful for preparing the phenolic resins of the present invention can be any aldehyde compound previously known for this purpose. Examples of aldehyde compounds useful in the invention include formaldehyde, acetaldehyde, propionaldehyde, isobutyraldehyde, 2-ethylbutrylaldehyde, 2-methylpentaldehyde, and 2-ethylhexaldehyde. The aldehyde compound of the invention may also be any of the other various forms of formaldehyde, including compounds which decompose to formaldehyde such as paraformaldehyde, trioxane, furfural, hexamethylenetetramine, benzaldehyde, and the like. The aldehyde compound can also be any of the acetals which liberate formaldehyde upon heating. Formaldehyde is the presently preferred aldehyde compound.

The preferred phenolic resins of the present invention are thermosetting phenol-formaldehyde resins.

The phenolic resin is typically utilized in an amount ranging from about 1 to 50 percent by weight, preferably from about 5 to 15 percent by weight, of the hydrogenated acrylonitrile-butadiene copolymer.

The curing component of the present invention can essentially be any known curing agent or system capable of crosslinking with both the remaining unsaturation of the hydrogenated acrylonitrile-butadiene copolymer and the inherent unsaturation of the elastomeric substrate to be coated. The preferred curing component of the invention comprises elemental sulfur in combination with an organic accelerator. The organic accelerator can be any organic compound or material known to accelerate crosslinking reactions with elastomeric materials and is preferably a derivative of various dithiocarbamic acids, xanthogenic acids, or thiuram sulfides. For example, the organic accelerator can be a derivative of dialkyl, alkylcycloalkyl, or alkylaryl dithiocarbamic acids; a derivative of alkyl or aryl xanthogenic acids; or a derivative of tetraalkyl or dialkyldiaryl thiuram mono-, di-, or tetra-sulfides. Various combinations of organic accelerators may also be utilized. Specific examples of organic accelerators include zinc dimethyldithiocarbamate, benzothiazyl disulfide, zinc isopropyl xanthate, and N-pentamethylene-ammonium-N'-pentamethyllenedithiocarbamate. It is presently preferred to utilize zinc dimethyldithiocarbamate in combination with benzothiazyl disulfide as the organic accelerator.

The curing component is typically utilized in an amount ranging from about 0.1 to 12, preferably from about 1 to 6 percent by weight of the hydrogenated acrylonitrile-butadiene copolymer. With respect to the preferred curing component of the invention, the elemental sulfur is typically utilized in an amount ranging from about 0.1 to 4 percent by weight, preferably from about 1.0 to 2.0 percent by weight, of the hydrogenated acrylonitrile-butadiene copolymer while the organic accelerator is typically utilized in an amount ranging from about 0.1 to 8 percent by weight, preferably from about 1.5 to 3 percent by weight, of the hydrogenated acrylonitrile-butadiene copolymer.

The solvent useful as the carrier vehicle for the coating composition of the present invention can essentially be any organic solvent or other material known to dissolve acrylonitrile-butadiene copolymers. Examples of organic solvents useful in the present invention include ketones such as methylethyl ketone, methylisobutyl ketone, and diisobutyl ketone; acetates such as butyl acetate; toluene, xylene and their derivatives; nitropropane; and ethylene dichloride.

The solvent of the present invention is typically utilized in an amount such that the coating composition has a total solids content ranging from about 5 to 30 percent, preferably from about 13 to 18 percent.

The coating composition of the present invention may contain other optional ingredients such as metal oxides, antioxidants and particulate reinforcements. Specific examples of metal oxides include zinc oxide, magnesium oxide, and lead oxide, while specific examples of particulate reinforcements useful in the invention include carbon black, precipitated silica, and fumed silica. The optional particulate reinforcement may be utilized in various amounts up to about 50 percent by weight of the hydrogenated acrylonitrile-butadiene copolymer.

The coating composition may be prepared by simply mixing the ingredients by hand with a spatula or the like or by mechanical mixing or shaking. The coating composition is typically applied to an elastomeric material and/or other substrate by dipping, spraying, wiping, brushing or the like, after which the coating is allowed to dry for a period of time typically ranging from about 30 minutes to 2 hours, preferably from about 45 minutes to 1 hour. the coating composition is typically applied to form a dry layer on the substrate having a thickness ranging from about 0.1 to 5 mils, preferably from about 0.5 to 1.5 mils.

The coating composition is then cured by exposing the coating to a temperature ranging from about 100° C. to 180° C., preferably from about 140° C. to 160° C. for a period of time ranging from about 2 minutes to 16 hours, preferably from about 10 to 20 minutes, depending on cure temperature with a higher cure temperature resulting in shorter exposure times. An approximately 15-minute cure at 150° C. is typical.

An elastomeric surface or substrate to be coated may optionally be pretreated with a chlorinating agent such as sodium hypochlorite and hydrochloric acid. The use of various chlorinating agents to prepare elastomeric materials for application of a coating composition is well known in the art. One example of a chlorinating agent is commercially available from Lord Corporation under the tradename CHEMLOK 7701. The chlorinating agent may be applied to the surface of the elastomeric material by brushing, dipping, spraying, wiping, or the like, after which the chlorinating agent is allowed to dry. Chlorinating agents tend to be very volatile and typically dry within a matter of seconds or minutes.

The coating composition of the present invention is particularly suitable for coating engine mounting devices which are comprised of elastomeric parts bonded to metal parts. The coating compositions of the present invention have the surprising ability to adequately bond to both the flexible elastomeric part and the rigid metal part so that the boundary between the elastomer and metal can be adequately protected by the coating composition. The present invention is therefore distinguished from many traditional protective coating compositions which only have the ability to bond to one type of substrate to be protected.

The following examples are provided for purposes of illustrating the present invention and shall not be constructed to limit the scope of the invention which is defined by the claims.

EXAMPLE 1

A coating composition is prepared by combining the following amounts of ingredients:

| Ingredient | No. of grams |
| --- | --- |
| Hydrogenated acrylonitrile-butadiene copolymer[a] | 100.0 |
| Phenol formaldehyde resin[b] | 10.0 |
| Sulfur | 1.5 |
| Zinc dimethyldithiocarbamate | 1.5 |
| Benzothiazyl disulfide | 0.5 |
| Zinc oxide | 5.0 |
| Carbon Black | 10.0 |

[a]ZETPOL 2020 (Zeon Chemicals, Inc.)
[b]DUREZ 12687 (Occidental Chemical)

The above ingredients are dissolved in an amount of methylisobutyl ketone solvent so as to create a coating composition having a total solids content of 15 percent.

The coating composition prepared as above is applied to 1 in. wide overlapping specimens of A135C rubber (sulfur-cured 60 durometer natural rubber) and standard 304 stainless steel at a dry film thickness of 0.7 mils with a one square inch overlap. CHEMLOK 7701 is utilized as a chlorination pretreatment for the natural rubber before application of the coating composition. The coated specimens are cured for approximately 15 minutes at 150° C. The coated specimens are tested for adhesion by pulling them apart in shear with a standard tensile testing machine (Instron Corporation). The coating composition exhibited 102 lbs. of pull in shear with respect to the natural rubber substrate, and 270 lbs. of pull in shear with respect to the stainless steel substrate. This data demonstrates that the coating composition exhibits adequate adhesion to both the natural rubber and steel substrates.

COMPARATIVE EXAMPLE 2

A traditional fluorocarbon coating (PLV-2000—Pelmor Labs) is applied to an additional set of specimens and cured according to the procedure of Example 1. The specimens coated with the fluorocarbon coating exhibited only 17.5 lbs. of pull in shear with respect to the natural rubber substrate, and 256 lbs. of pull in shear with respect to the stainless steel substrate.

Fatigue Resistance

The fatigue resistances of the coated natural rubber specimens and the respective coating compositions of Examples 1 and 2 are also tested. The fatigue resistance test involves flexing the coated natural rubber specimen until cracking of the coating or substrate is observed. Specifically, the flex test is a slight modification of the standard ASTM D-813 rubber deterioration/crack growth test. The ASTM D-813 test is modified in that the rubber is unpierced and has a protective coating. After 1500 cycles, the fluorocarbon coating of Example 2 had cracked at the flex point and was peeling away from the natural rubber substrate. At 80,000 cycles, the natural rubber coated with the composition of Example 1 was beginning to exhibit signs of cracking, as was the coating composition itself. At 120,000 cycles, the natural rubber underneath the coating composition of Example 1 was severely cracked, while the coating composition itself showed only moderate signs of cracking.

Oil and Fuel Resistance

The coating compositions of Examples 1 and 2 are also tested for their ability to protect the natural rubber substrate from oil and fuel. The oil resistance test involves the submersion of a coated natural rubber substrate in ASTM #3 oil for 70 hours at approximately 21° C. The jet fuel resistance test involves the submersion of a coated natural rubber substrate in standard JP-4 jet fuel for 22 hours at approximately 21° C. The percent weight change of the substrate is measured and a high percent weight change indicates that the substrate absorbed a significant amount of oil or fuel. A small weight change indicates that the coating prevented the absorption of oil or fuel. The results of the test are shown below.

| Test | Percent Weight Change | | |
|---|---|---|---|
| | No Coating | Example 1 | Example 2 |
| ASTM #3 Oil | 46.5 | 1.1 | −0.2 |
| JP-4 Fuel | 106.0 | 2.5 | 0.1 |

As can be seen from the above data, the coating compositions of the present invention provide adhesion to a variety of substrates while maintaining substantial resistance to fatigue and degradation by corrosive materials.

What is claimed is:

1. A coating composition comprising (a) a hydrogenated copolymer of a conjugated diene and an unsaturated nitrile, (b) a phenolic resin, (c) a curing component, and (d) a solvent wherein the coating composition has a total solids content ranging from about 5 to 30 percent.

2. A coating composition according to claim 1 wherein the conjugated diene is selected from the group consisting of 1,3-butadiene; 2,3-dimethylbutadiene; 1,3-pentadiene; 1,3-hexadiene; 2,4-hexadiene; 1,3-heptadiene; piperylene; and isoprene.

3. A coating composition according to claim 2 wherein the conjugated diene is 1,3-butadiene.

4. A coating composition according to claim 1 wherein the unsaturated nitrile corresponds to the following formula:

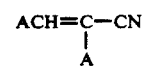

wherein each A is hydrogen or a hydrocarbyl group having from 1 to about 10 carbon atoms.

5. A coating composition according to claim 1 wherein the unsaturated nitrile is acrylonitrile or methacrylonitrile.

6. A coating composition according to claim 1 wherein the hydrogenated copolymer has an unsaturation level between about 1 and 20 mole percent.

7. A coating composition according to claim 6 wherein the unsaturation level is between about 3 and 7 mole percent.

8. A coating composition according to claim 1 wherein the phenolic resin is prepared by reacting a phenolic compound with an aldehyde compound under acidic, neutral or basic conditions with an appropriate catalyst.

9. A coating composition according to claim 8 wherein the phenolic compound is selected from the group consisting of phenol, p-t-butylphenol, p-phenylphenol, m-bromophenol, o-chlorophenol, p-chlorophenol, p-alkoxyphenol, o-cresol, m-cresol, p-cresol, 2-ethylphenol, amylphenol, nonylphenol, xylenol, naphthol, carvacrol, cashew nutshell liquid, resorcinol, orcinol, phloroglucinol, pyrocatechol, pyrogallol, salicylic acid, bisphenol A, bisphenol S, and combinations thereof.

10. A coating composition according to claim 9 wherein the phenolic compound is phenol.

11. A coating composition according to claim 8 wherein the aldehyde compound is selected from the group consisting of formaldehyde, acetaldehyde, propionaldehyde, isobutyraldehyde, 2-ethylbutrylaldehyde, 2-methylpentaldehyde, 2-ethylhexaldehyde, para-formaldehyde, trioxane, furfural, hexamethylenetetramine, and benzaldehyde.

12. A coating composition according to claim 11 wherein the aldehyde compound is formaldehyde.

13. A coating composition according to claim 1 wherein the curing component comprises elemental sulfur in combination with an organic accelerator.

14. A coating composition according to claim 13 wherein the organic accelerator is a derivative of a dithocarbamic acid, a xanthogenic acid, or a thiuram sulfide.

15. A coating composition according to claim 13 wherein the organic accelerator is selected from the group consisting of zinc dimethyldithiocarbamate, benzothiazyl disulfide, zinc isopropyl xanthate, N-pentamethylene-ammonium-N'-pentamethylenedithiocarbamate, and combinations thereof.

16. A coating composition according to claim 15 wherein the organic accelerator is a combination of zinc dimethyldithiocarbamate and benzothiazyl disulfide.

17. A coating composition according to claim 1 wherein the solvent is selected from the group consisting of ketones; acetates; toluene, xylene and their derivatives; nitropropane; and ethylene dichloride.

18. A coating composition according to claim 1 wherein the phenolic resin is present in an amount ranging from about 1 to wherein the phenolic resin is present in an amount ranging from about 1 to 50 percent by weight of the hydrogenated copolymer and the curing component is present in an amount ranging from about 0.1 to 12 percent by weight of the hydrogenated copolymer.

19. A coating composition according to claim 18 wherein the phenolic resin is present in an amount ranging from about 5 to 15 percent by weight of the hydrogenated copolymer, the curing component is present in an amount ranging from about 1 to 6 percent by weight of the hydrogenated copolymer, and wherein the coating composition has a total solids content ranging from about 13 to 18 percent.

20. A method of coating a substrate comprising applying a coating composition to the surface of the substrate wherein the coating composition comprises the coating composition of claim 1.

* * * * *